J. F. LINCOLN.
SAFETY CHARGING DEVICE FOR BATTERIES.
APPLICATION FILED MAR. 21, 1917.
1,373,621.
Patented Apr. 5, 1921.
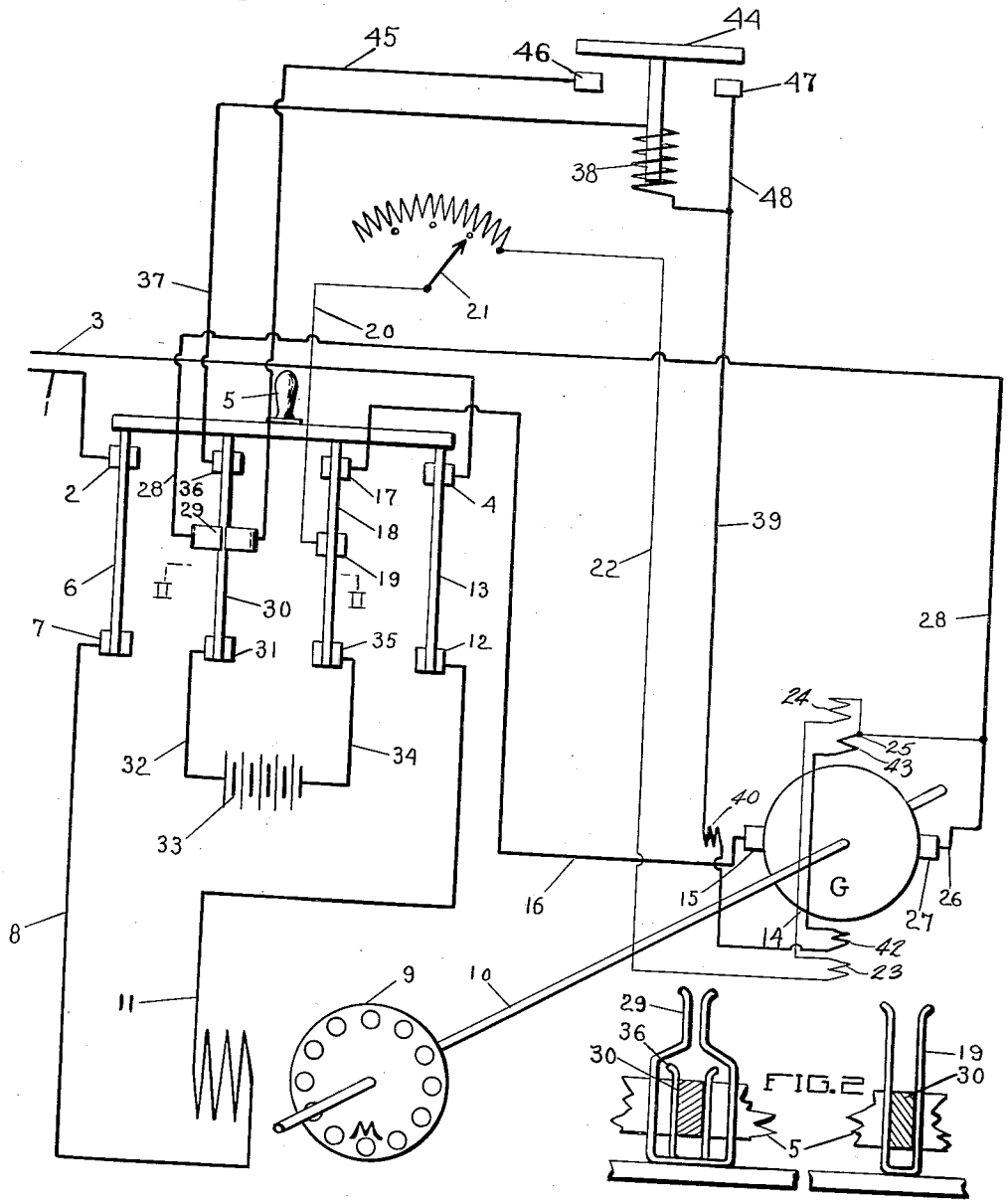

UNITED STATES PATENT OFFICE.

JAMES F. LINCOLN, OF CLEVELAND, OHIO.

SAFETY CHARGING DEVICE FOR BATTERIES.

1,373,621.  Specification of Letters Patent.  Patented Apr. 5, 1921.

Application filed March 21, 1917. Serial No. 156,382.

*To all whom it may concern:*

Be it known that I, JAMES F. LINCOLN, a citizen of the United States of America, residing at Cleveland, Cuyahoga county, Ohio, have invented new and useful Safety Charging Devices for Batteries, of which the following is a specification.

This invention relates to current controlling apparatus.

This invention has utility as a safety device, particularly in connection with charging apparatus for electric storage batteries.

Referring to the drawings:

Figure 1 is a wiring diagram of an embodiment of the invention in a charging device for storage batteries; and Fig. 2 is a fragmentary section on the line II—II, Fig. 1.

The actuation may be from an external source of current supply as the line 1 to the terminal 2 and the line 3 to the terminal 4, circuit from which terminals 2 and 4 may be closed by the switch 5 for conduct of current from the terminal 2 by the blade 6, terminal 7, line 8 to the squirrel cage motor 9 on the shaft 10, which circuit is completed through the line 11, terminal 12 and blade 13 to the terminal 4.

Fast on this shaft 10 is the armature 14 having brush 15 connected by line 16 to terminal 17 and by blade 18, terminal 19 to line 20 extending to the manually adjustable rheostat 21 connected by the line 22 to the shunt field windings 23, 24, connected through the terminal 25 and line 26 to the brush 27. The terminal 17 is the same height as terminal 19. In one position of movement of the switch 5 before its fully thrown position, the current from battery 33 flows through line 32 to switch blade 30 to clip terminal 29, thence through line 28 to brush 27 into armature 14, brush 15, line 16, clip 17, blade 18, and line 34. Accordingly this machine in starting may operate as a shunt motor in getting the shaft 10 under rotation for the motor 9 to take hold.

Further movement of the switch 5 causes the blade 30 to clear the terminal 29 and simultaneously engage the terminal 36 so that this normal operation in charging may be to the battery 33 from the line 37, solenoid coil 38, line 39, interpole field winding 40, line 41, series field windings, 42, 43, to the terminal 25, line 26 and brush 27. In this further movement the blades 6 and 13 complete the A. C. supply circuit to the motor 9.

The clip terminals 2, 4, are of the same height as terminal 36 and accordingly the shunt motor starting action of armature 14 from the battery 33 is effective to bring the motor 9 up to a speed at which it is safe to complete the throw of the switch 5 thus completing the supply circuit to the driving motor 9 and also moving blade 30 clear of clip 29 and into clip 36 to cut out the battery 33 from supplying energizing current to the coils 23, 24. The machine 14 now operates as a shunt wound generator.

The current for charging the battery 33 may build up in excess of 15 amperes. This generator circuit to the battery is not direct from terminal 29 to the blade 30, for with the completion of throw of the switch 5 (see Fig. 2), the flow is through the circuit of less resistance than that of the coils 43, 42, 40, and therefore is from the brush 27 through connections 26, 25, 28, terminal 29, connected with line 45, terminal 46, relay 44, terminal 47, and line 48 to line 39, solenoid 38, line 37 to terminal 36 and blade 30, terminal 31, line 32, battery 33, line 34, terminal 35, blade 18, terminal 17, and line 16 to brush 15.

The gravity-fall relay 44 may be set to be lifted by the solenoid 38 at a 15 ampere current. This automatically makes a compound wound generator with an interpole, for lifting of the relay 44 opens the lower resistance circuit from line 28 thereby resulting in circuit through the series fields 43, 42 and interpole 40 becoming active through the coil 38 in holding the relay 44 open. With the motor 9 actuated, say by a current supply liable to range of fluctuation or a possible cessation which may be of but short duration, there is possibility of the battery current tending to come back upon the compound generator 14, making of such generator a differentially compound motor with disastrous results in running away due to weakening of the field. This condition may be aggravated by the interpole effective with certain brush settings as a setting a little too far away from its like pole causes the interpole to weaken the field and speed up the machine.

Such a possibility is automatically avoided herein by the relay 44 which insures an automatic cut-out of the series and interpole field windings 42, 40 when the charging current from the generator 14 falls below, say, 10 amperes. The machine is now running as a shunt generator in the same way as when the switch 5 reached the fully thrown position; the generated current to the battery 33 being by connections 27, 26, 25, 28, 29, 45, 46, 44, 47, 48, 38, 37, 36, 30, 31, 32, and thence by connections 34, 35, 18, 17, 16, to brush 15, instead of the higher resistance circuit of the coils 43, 42, 40. The relay is ready for the automatic pick up. When the supply voltage returns, the motor takes hold for driving and the current of 15 amperes through the relay is sufficient to raise it and place the series and interpole windings in circuit.

Accordingly, the manual starting of the generator 14, by the switch 5, as shunt will build itself up to operate as a compound machine automatically through the relay 44, adapting itself to the charging and the generator is safeguarded against battery reversal current injury.

What is claimed and it is desired to secure by Letters Patent is:

1. A battery, a generator for charging said battery, a motor for actuating the generator, said generator having shunt and series field windings, a switch movable from an inactive position to one position for the generator to operate as a shunt motor for operating the motor idly and to a second position for supplying power current to the motor for the motor to drive the generator and the generator to be operated thereby as a generator with a series winding supplementing a shunt winding, and control means for converting the generator from shunt to compound as it builds up load and back to shunt as the load drops.

2. A battery charging installation embodying a motor, a generator, a switch, electric current supply means for the motor to the switch, a battery, line connections between the motor, generator, battery and switch including a series winding for the generator, said switch movable to one position to permit the battery current to flow through the line connections to actuate the generator as a motor for starting the motor as current is supplied past said switch to the motor, and to another position to change the generator from driving the motor to be driven thereby as a generator, and a solenoid control for the series winding regulating the generator operation as a generator.

3. A battery, a dynamo electric machine connected to said battery, a prime mover for actuating the machine, said machine having shunt and series fields, manual means for controlling the series field as cut out in motor operation of the machine, and current flow actuated means for cutting out the series field when the generator output is below a determined amount.

4. A battery charging installation embodying a battery, a motor, a generator, a switch, electric current supply means for the motor to the switch, line connections between the motor, generator, battery and switch including a series winding for the generator, said switch movable from an inactive position to a first position actuating the generator as a shunt motor from battery current for starting the motor as current is supplied by said switch at said position thereof to the motor, said switch being movable in the same direction past the first position to a second position to change over the generator from a shunt motor to a shunt generator actuated by the motor for charging the battery, and a solenoid control for the series winding to regulate the generator operation as a shunt generator.

5. A battery charging dynamo electric machine having shunt, supplementing series and interpole windings, a prime mover for actuating the machine, and current flow actuated means for short-circuiting the interpole and series windings in maintaining generator operation of the machine.

6. A battery charging dynamo electric machine having shunt, supplementing series and interpole windings, a prime mover for actuating the machine, and solenoid means for short-circuiting the interpole and series windings in maintaining the machine operation as a generator.

7. A battery charging dynamo electric machine having shunt, supplementing series and interpole field windings, a prime mover for actuating the machine, and solenoid means for short-circuiting the series field windings in maintaining the machine operation as a generator.

8. A battery charging installation embodying a battery, a motor, a generator, a switch, electric current supply means for the motor to the switch, line connections between the motor, generator, battery and switch, said switch having three positions, a first inactive position, a second position permitting battery current to operate the generator as a motor for getting the motor proper under speed idly, and a third position supplying current to the motor proper as under speed from the second position for motor operation, and changing the generator from its motor operation to a shunt generator as actuated by the motor proper for charging the battery, and a current flow actuated switch between the generator and battery for changing the shunt generator to a supplementing compound generator as current is built up and acting as current drops to change the generator back from compound to shunt generator in the uninterrupted generator operation of the generator.

In witness whereof I affix my signature.

JAMES F. LINCOLN.